(12) United States Patent
Lee et al.

(10) Patent No.: US 7,469,261 B2
(45) Date of Patent: Dec. 23, 2008

(54) APPARATUS AND METHOD FOR PROTECTING SYSTEM DATA ON COMPUTER HARD-DISK

(76) Inventors: Chang-Ju Lee, 136-2101 Kwanack Dreamtown, Bongcheon5-Dong, Gwanack-Ku, Seoul 151-774 (KR); Young-Uck Jeon, 902-202 Kumkang Apt., 1148-4 Sanbon-Dong, Kunpo-Shi, Kyungki-Do 435-040 (KR); Sung-Uk Oh, 305-1504 Poonglim Apt., Daehwa-Dong, Ilsan-Ku, Koyang-Shi, Kyungki-Do 411-707 (KR)

( * ) Notice: Subject to any disclaimer, the term of this patent is extended or adjusted under 35 U.S.C. 154(b) by 261 days.

(21) Appl. No.: 11/596,641

(22) PCT Filed: Jun. 3, 2005

(86) PCT No.: PCT/KR2005/001670

§ 371 (c)(1),
(2), (4) Date: Nov. 14, 2006

(87) PCT Pub. No.: WO2005/119460

PCT Pub. Date: Dec. 15, 2005

(65) Prior Publication Data

US 2007/0226266 A1 Sep. 27, 2007

(30) Foreign Application Priority Data

Jun. 4, 2004 (KR) .................. 10-2004-0040871

(51) Int. Cl.
*G06F 17/30* (2006.01)
*G06F 17/00* (2006.01)
*G06F 17/50* (2006.01)
(52) U.S. Cl. .................. 707/200; 707/102; 716/17
(58) Field of Classification Search .................. 707/2, 707/102, 200; 716/17
See application file for complete search history.

(56) References Cited

FOREIGN PATENT DOCUMENTS

| JP | 1998-240597 | 9/1998 |
|----|-------------|--------|
| KR | 1019980076358 A | 11/1998 |
| KR | 1020010019732 A | 3/2001 |
| KR | 1020020024227 A | 3/2002 |
| KR | 1020020097344 A | 12/2002 |

OTHER PUBLICATIONS

International Serch Report; Application No. PCT/KR2005/001670; Date: Oct. 11, 2005.
Written Opinion of the International Searching Authority; Application No. PCT/KR2005/001670; Date: Oct. 11, 2005 All the references cited in the Search Report are listed above.

*Primary Examiner*—Hosain T Alam
*Assistant Examiner*—Navneet K Ahluwalia
(74) *Attorney, Agent, or Firm*—Cantor Colburn LLP

(57) ABSTRACT

An apparatus and method for protecting and recovering system data stored in a computer hard disk from corruption that may occur due to malicious or accidental operation during use of a computer are provided. The apparatus manages non-preemptively changed system data in a system area.

7 Claims, 11 Drawing Sheets

FIG.4

| SYSTEM AREA INDEX | MAPPING INDEX |
|---|---|
| 0 | 0 |
| 1 | 1 |
| 2 | 2 |
| 3 | NULL |
| 4 | NULL |
| 5 | NULL |
| 6 | NULL |
| 7 | NULL |
| 8 | NULL |

MAPPING TABLE

| SYSTEM AREA INDEX | PROTECTION STATE |
|---|---|
| 0 | ORIGINAL |
| 1 | ORIGINAL |
| 2 | ORIGINAL |
| 3 | NON-PROTECTED |
| 4 | NON-PROTECTED |
| 5 | NON-PROTECTED |
| 6 | NON-PROTECTED |
| 7 | NON-PROTECTED |
| 8 | NON-PROTECTED |

SYSTEM AREA INFORMATION TABLE

APPARATUS AND METHOD FOR PROTECTING SYSTEM DATA ON COMPUTER HARD-DISK

TECHNICAL FIELD

The present invention relates to an apparatus and method for protecting system data stored in a computer hard disk, and more particularly, to a system data protection apparatus and method for protecting and recovering system data stored in a computer hard disk from corruption that may occur due to malicious or accidental operation during use of a computer.

BACKGROUND ART

Generally, a variety of programs (or softwares) are installed in a computer system to drive hardware of a computer such that the hardware and the softwares operate in organic association to execute jobs desired by a user.

During use of a computer, it frequently happens that system data stored in a hard disk is fatally damaged by attack of diverse virus programs or a user's carelessness, mistake, or malicious behaviors. Besides, an unexpected situation or installation or removal of a particular program may cause trouble in the operation of a computer system.

To cope with the above-described problems occurring in a computer system, the following conventional techniques are used to protect data stored in a computer hard disk.

Firstly, a vaccine program is used to protect a computer system from a virus program or to cure a computer system attacked by a virus program. This technique is useful to protect a computer system from already known virus programs but is useless against new virus programs. In addition, even if a virus program has already been known, it frequently happens that system data corrupted by the virus program is not recovered and there is no way but to delete the corrupted system data. Deletion of the system data fatally damages an operating system of the computer, resulting in abnormal operation of the operating system.

Secondly, after programs necessary for a computer system are installed, images in a hard disk is stored in another recording medium (for example, a compact disk-read only memory (CD-ROM)), and the images stored in the recording medium are copied to the hard disk when trouble occurs in the computer system in order to recover corrupted data. According to this technique, a user needs to backup the images stored in the hard disk whenever installing a new program in or deleting a program from the hard disk or recording important data onto the hard disk. A job of backing up the images in the hard disk to another recording medium and recovering the computer system using the backed-up hard disk images requires an extra recording medium and a lot of working time, and it is also very complex.

Thirdly, while the original of a system data is kept in a hard disk as it is, only changed content is stored in a separate system change area. When a wrong change occurs in a system protection area due to a virus program or a user's carelessness, a computer system can be easily recovered by deleting the content stored in the system change area. However, since all data (i.e., both of a used area and an empty area) in the system protection area set by a hard disk dividing unit is protected, a large buffer area (i.e., the system change area) is required to protect the system data. In other words, the size of the buffer area must be the same as that of the system protection area to protect the system data stored in the system protection area without recovery operation. For example, to protect a 120-gigabyte system protection area, a capacity of 120 gigabytes for all system data reflected to the system protection area and additional memory space for other data are required.

Moreover, since the empty area included in the system protection area is also protected, a load is given to an access to the system data after a hard disk protection program is installed. As a result, the speed of the computer system decreases and the empty area in the system protection area cannot be used at all. In addition, after system recovery, the computer system must be booted in a manager mode and program reinstallation must be performed in order to change a recovery original. Accordingly, it is inconvenient to change the recovery original and it takes a lot of time to create a new recovery original. Besides, if there is an attack of a virus program or a user makes a mistake in installing a program in a state where the computer system has been booted in manager mode to change the recovery original, the computer system cannot be recovered to normal.

DISCLOSURE OF THE INVENTION

The present invention provides an apparatus and method for protecting system data on a computer hard disk, by which a system area information table is provided to set a protection target among data in a system area in units of clusters, a mapping table is provided to construct a correspondence relation between original system data stored in the system area and changed system data, the changed system data is managed non-preemptively in the system area to allow an entire disk area to be efficiently used, thereby quickly recovering system data needing protection when the system data is corrupted while a computer system is being used.

The present invention also provides a computer readable recording medium for recording a program for executing the method on a computer.

According to an aspect of the present invention, there is provided an apparatus for protecting system data on a computer hard disk, in which changed system data is managed non-preemptively in a system area. The apparatus includes an installation unit separately setting a system area and a meta buffer area on the computer hard disk and reserving areas for a meta information table, a system area information table, and a mapping table in the meta buffer area; an initialization/recovery unit initializing the system area information table, in which each of clusters in the system area is marked as one among "original", "protected", and "non-protected" based on one of a volume bitmap and a file allocation table (FAT), and initializing the mapping table storing mapping relation between a cluster position recognized by a file system and a cluster position where data is actually stored in the system area; a write operation processing unit, with respect to a write operation on a cluster of the system area designated by the file system, performing the write operation on another corresponding cluster designated by the mapping table when the cluster designated by the file system is marked as "original" in the system area information table, performing the write operation on a cluster corresponding to an empty space in the system area when the cluster designated by the file system is marked as "original" in the system area information table and a value designated by the mapping table with respect to the cluster designated by the file system indicates an initial state, storing data read from the cluster designated by the file system in an empty space in the system area and performing the write operation on the cluster designated by the file system when the cluster designated by the file system is marked as "protected" in the system area information table, and performing the write operation on the cluster designated by the file system in otherwise cases; a read operation processing unit, with respect to a read operation on a cluster of the system area designated by the file system, performing the read operation on another corresponding cluster designated by the mapping table, and performing the read operation on the cluster designated by the file system only when a corresponding value designated by the mapping table indicates the initial state; a current state backup unit sequentially reading all items of the mapping table one by one, storing data stored in a cluster designated by the mapping table in a cluster designated by the file system with respect to an item in which the cluster designated by the file system is different from the cluster designated by the mapping table, and then calling the initialization/recovery unit to perform initialization; and a removing unit removing the meta buffer area set by the installation unit to integrate the meta buffer area into the system area.

According to another aspect of the present invention, there is provided a method of protecting system data on a computer hard disk, in which changed system data is managed non-preemptively in a system area. The method includes the operations of (a) generating a system area information table, in which each of clusters in the system area is marked as one among "original", "protected", and "non-protected" based on one of a volume bitmap and a FAT, and initializing the mapping table storing mapping relation between a cluster position recognized by a file system and a cluster position where data is actually stored in the system area; (b) with respect to a write operation on a cluster of the system area designated by the file system when an original change mode has not been set, performing the write operation on another corresponding cluster designated by the mapping table when the cluster designated by the file system is marked as "original" in the system area information table, performing the write operation on a cluster corresponding to an empty space in the system area when the cluster designated by the file system is marked as "original" in the system area information table and a value designated by the mapping table with respect to the cluster designated by the file system indicates an initial state, storing data read from the cluster designated by the file system in an empty space in the system area and performing the write operation on the cluster designated by the file system when the cluster designated by the file system is marked as "protected" in the system area information table, and performing the write operation on the cluster designated by the file system in otherwise cases; (c) with respect to a read operation on a cluster of the system area designated by the file system when the original change mode has not been set, performing the read operation on another corresponding cluster designated by the mapping table, and performing the read operation on the cluster designated by the file system only when a corresponding value designated by the mapping table indicates the initial state; and (d) generating a new system area information table, in which each of clusters in the system area is marked as one among "original", "protected", and "non-protected" based on one of the volume bitmap and the FAT, and initializing the mapping table storing mapping relation between a cluster position recognized by a file system and a cluster position where data is actually stored in the system area.

According to still another aspect of the present invention, there is provided a computer readable recording medium for recording a program for executing the above-described method on a computer.

BRIEF DESCRIPTION OF THE DRAWINGS

FIG. 4 illustrates initialized content of a system area information table and a mapping table used in the present invention.

BEST MODE FOR CARRYING OUT THE INVENTION

Hereinafter, preferred embodiments of an apparatus for protecting system data on a computer hard disk, in which changed system data is managed non-preemptively in a system area, according to the present invention will be described in detail with reference to the attached drawings.

Figure 1:
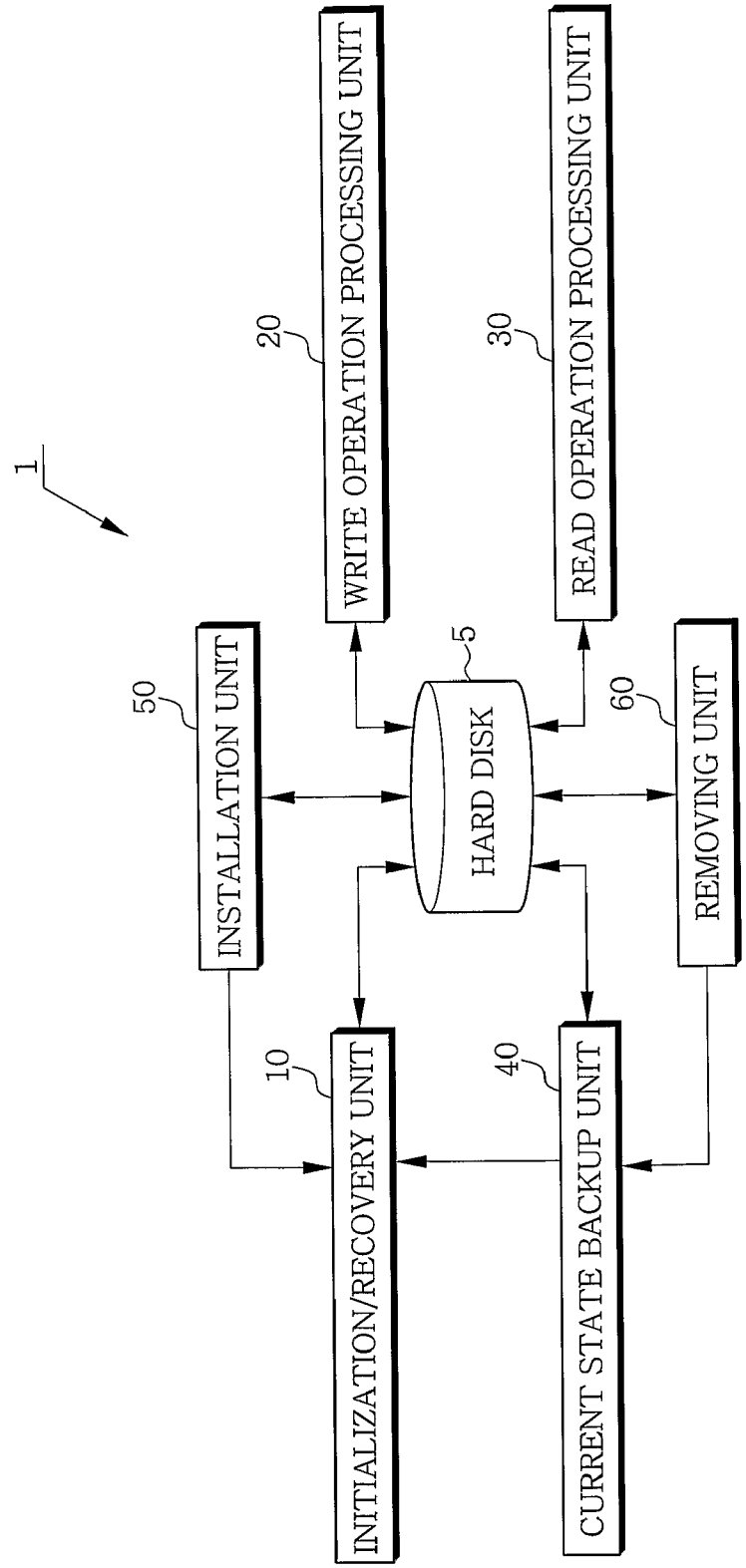
FIG. 1 is a block diagram of an apparatus for protecting system data on a computer hard disk, in which changed system data is managed non-preemptively in a system area, according to an embodiment of the present invention.

Referring to FIG. 1, an apparatus for protecting system data on a hard disk 5 according to the present invention, which will be hereinafter referred to as an hard disk protection apparatus 1, includes an initialization/recovery unit 10, a write operation processing unit 20, a read operation processing unit 30, a current state backup unit 40, an installation unit 50, and a removing unit 60. Each element of the hard disk protection apparatus 1 is implemented as a combination of hardware and software of a computer system (not shown) including the hard disk 5. The computer system using the present invention is a typical computer system, and therefore, the configuration of the hardware is obvious to those skilled in the art. Thus, a detailed description thereof will be omitted.

Figure 2:
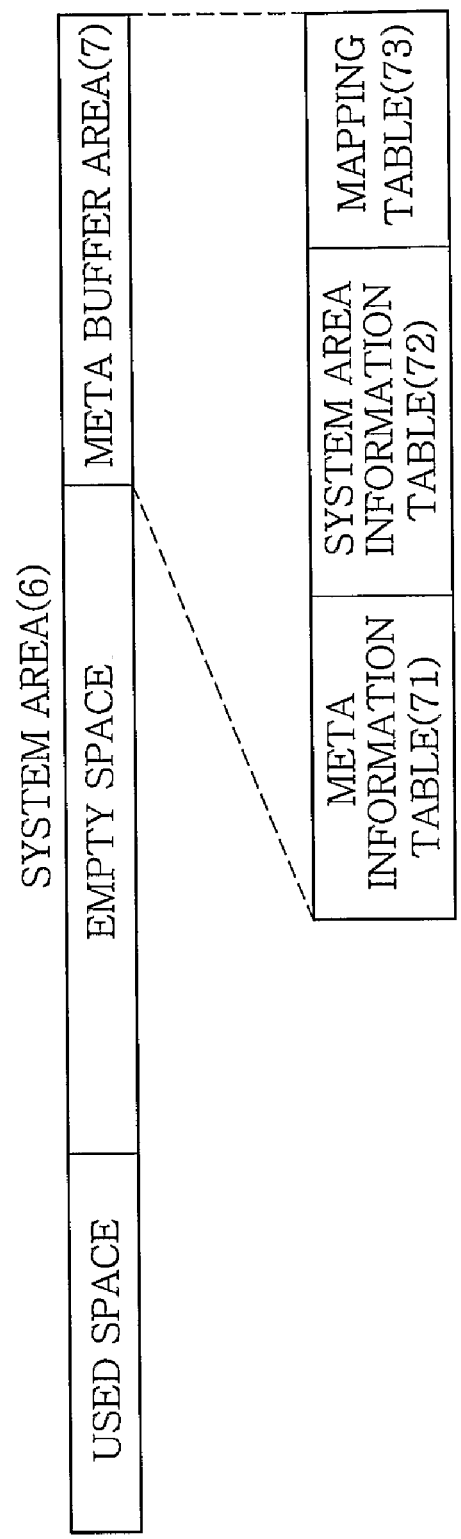
FIG. 2 is a conceptual diagram of a system area according to an embodiment of the present invention.

The installation unit 50 receives meta information (which will be described later) including a size of a meta buffer area 7 (wherein the size of the meta buffer area 7 can be determined according to a systematically predetermined scheme) from a user and installs in the hard disk 5 software and device drivers that constitute the write operation processing unit 20, the read operation processing unit 30, and the current state backup unit 40. Thereafter, the installation unit 50 separately reserves the meta buffer area 7 within the system area 6 and moves clusters that are in use in the reserved meta buffer area 7 to the system area 6 outside the meta buffer area 7. Next, as shown in FIG. 2, the installation unit 50 reserves areas respectively for a meta information table 71, a system area information table 72, and a mapping table 73 in the meta buffer area 7. Next, the installation unit 50 calls the initialization/recovery unit 10 to perform initialization.

Figure 3:
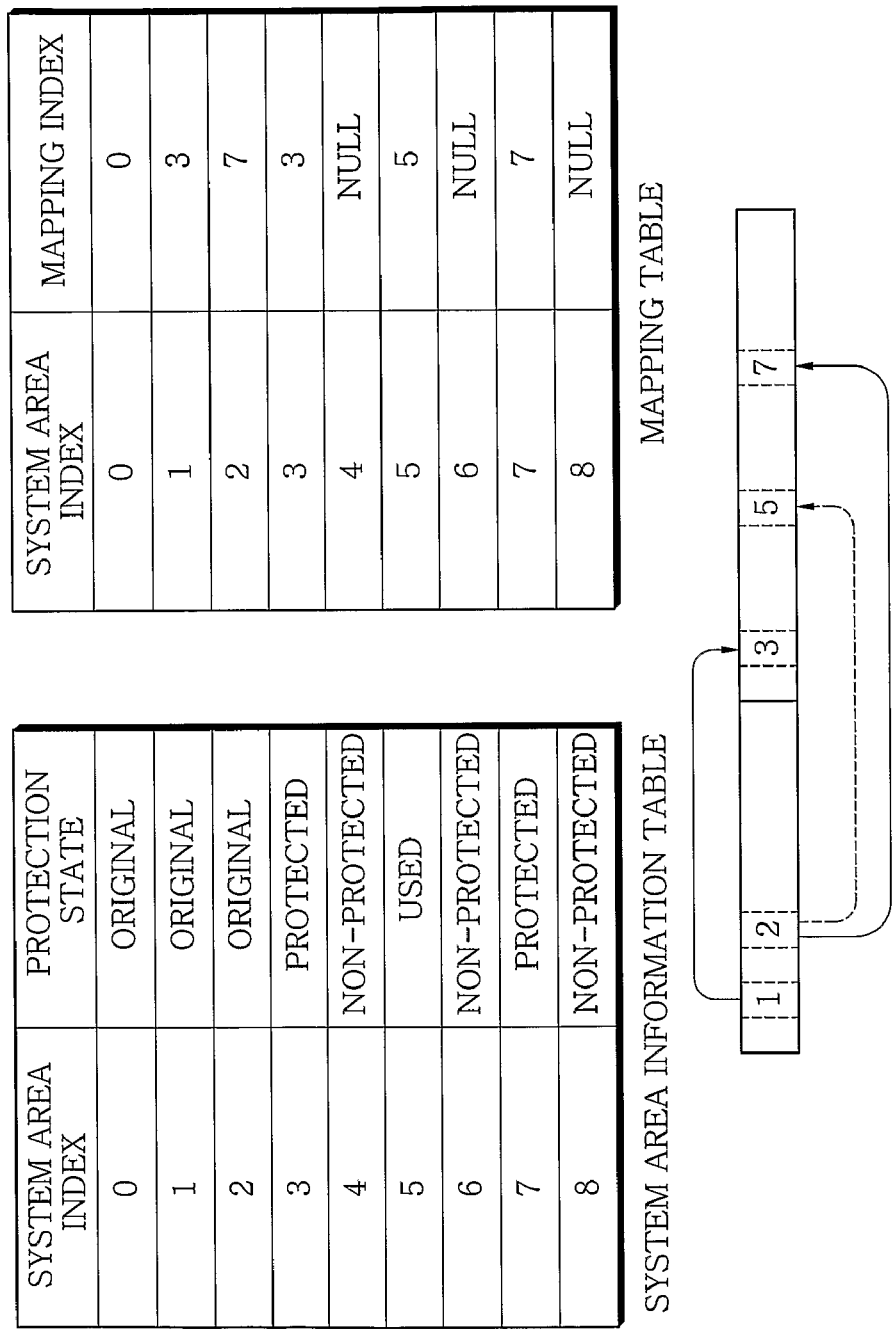
FIG. 3 illustrates the structure of a system area information table and the structure of a mapping table used in the present invention.

The system area information table 72 shows a protection state ("original", "protected", "used", or "non-protected") of system data with respect to each system area index for identifying a cluster in the system area 6, as illustrated in FIG. 3. Clusters marked as "original" are the clusters that have already been used in the system area 6 in an initializing operation. After the initializing operation, changed data for these clusters are not directly reflected to the corresponding clusters but is separately stored in an empty space (i.e., a cluster marked as "non-protected" in the system area information table 72) within the system area 6. Since the space, i.e., the cluster where the changed data is stored is recognized as an unused space by a file system, the protection state of the cluster is marked as "protected" in the system area information table 72 in order to prevent the file system from storing other data in the cluster. When the file system is to write data to a cluster marked as "protected" because the file system recognizes the cluster marked as "protected" as an empty space, non-preemptively, data that has preoccupied the cluster marked as "protected" is stored in another empty space and the data that the file system is to write is stored in the cluster that is marked as "protected" and is designated by the file system. Here, the cluster to which the file system writes is marked as "used". In another embodiment, the cluster may be marked as "non-protected" instead of "used".

The mapping table 73 stores mapping information (or a mapping index) indicating a position in the system area 6, in which changed data with respect to a system area index for the system area 6 is stored, as show in FIG. 3. Referring to FIG. 3, clusters respectively having system area indexes 1 and 2 are respectively mapped to clusters having system area indexes 3 and 7. In detail, when the file system is to store new data in a cluster corresponding to a system area index 5 in which changed data corresponding to the system area index 2 has already been stored, the changed data preoccupying the cluster corresponding to the system area index 5 is moved to a new space, i.e., the cluster corresponding to the system area index 7 and the new data that the file system is to write occupies the cluster corresponding to the system area index 5. Accordingly, the file system can always store new data in a desired position, and when the file system requests a position occupied by data changed from an original, the changed data yields its occupation to the new data that the file system is to write.

During the initializing operation, when a system area index has a protection state of "original" in the system area information table 72, the same value as the system area index is allocated as an initial value to a corresponding mapping index in the mapping table 73. When the system area index does not have the protection state of "original", NULL is allocated as the initial value to a corresponding mapping index in the mapping table 73. FIG. 4 illustrates the initialized state of the system area information table 72 and the mapping table 73.

The meta information table 71 stores various types of information, i.e., meta information used by software implementing the hard disk protection apparatus 1 (hereinafter, referred to as a "hard disk protection program") in a table format. The meta information includes a File Allocation Table (FAT) (in case of a FAT32 file system) showing a storage position of each of clusters in the system area 6, which are used by a file system for an operating system to organize files, or a volume bitmap (in case of a New Technology File System (NTFS)). The meta information may include various environment variables needed to operate the hard disk protection program, for example, used capacity of the buffer area 7, a start point of the data buffer area 74, a cluster size, an automatic recovery period, and a password.

The initialization/recovery unit 10 is operated to produce an environment for protecting system data after the hard disk protection apparatus 1 stores the system data in the system area 6 or to recover the original state of the system data when the system data stored in the hard disk 5 is corrupted. For this purpose, the initialization/recovery unit 10 sets the meta buffer area 7 in a partial area of the system area 6 and stores and manages the meta information table 71, the system area information table 72, and the mapping table 73 in the meta buffer area 7. In detail, the initialization/recovery unit 10 detects space used in the system area 6 based on a volume bitmap or a FAT and marks a currently used space as "original" and an empty space as "non-protected" with respect to individual system area indexes in the system area information table 72. In addition, the initialization/recovery unit 10 initializes the mapping table 73 in the meta buffer area 7 and generates the meta information table 71 based on the meta information.

The write operation processing unit 20 and the read operation processing unit 30 intercept and process the respective write and read operations of the operating system writing and reading data into and from files during operation of the computer system. The hard disk protection apparatus 1 manages an original change mode as meta information. In detail, when the hard disk protection apparatus 1 receives a request to change into the original change mode from a user after the initialization/recovery unit 10 performs an operation, the hard disk protection apparatus 1 changes into the original change mode so that the user can directly change data in the system area 6. Thereafter, upon receiving a request to cancel the original change mode from the user, the hard disk protection apparatus 1 returns to an original protection mode and the initialization/recovery unit 10 performs initialization.

The write operation processing unit 20 receives from the file system a system area index corresponding to a cluster on which a write operation is to be performed in the system area 6 and operates differently according to a mode. In other words, when the original change mode has been set, the write operation processing unit 20 performs the write operation on a position, i.e., the cluster designated by the file system in the system area 6. However, when the original change mode has not been set, the write operation processing unit 20 performs the write operation on a cluster of the system area 6 that is designated by the mapping table 73 if the protection state corresponding to the received system area index is marked as "original" in the system area information table 72. However, when a mapping index corresponding to the received system area index is set to a value of an initial state (i.e., the same value as the system area index or NULL) in the mapping table 73, the write operation processing unit 20 secures an empty space in the system area 6, performs the write operation on a cluster allocated to the secured empty space, marks the protection state of the cluster where new data is written as "protected" in the system area information table 72, and records a position of the cluster where the new data is written in a corresponding item block of the mapping table 73. When the protection state, i.e., protection information corresponding to the received system area index is marked as "protected" in the system area information table 72, the write operation processing unit 20 secures an empty space in the system area 6, reads data from the cluster corresponding to the received system area index, stores the read data in the secured empty space, stores new data that the file system has requested to write in the cluster corresponding to the received system area index, and records a position of the cluster, where the new data is stored, in an item of mapping information corresponding to the received system area index in the mapping table 73. As described above, after moving data, which preoccupies a cluster corresponding to a system area index designated by the file system to write new data, to another cluster, the write operation processing unit 20 performs the write operation on the cluster corresponding to the system area index and changes the protection information corresponding to the system area index from "protected" to "used". When the protection information corresponding to the received system area index is marked as "used" or "non-protected" in the system area information table 72, the write operation processing unit 20 performs the write operation on the cluster corresponding to the received system area index in the system area 6. Meanwhile, when content corresponding to the FAT or the volume bitmap is changed due to the operation of the write operation processing unit 20, changed content is reflected to a FAT or a volume bitmap included in the meta information table 71.

The read operation processing unit 30 receives from the file system a system area index corresponding to a cluster on which a read operation is to be performed in the system area 6 and operates differently according to a mode. In other words, when the original change mode has been set, the read operation processing unit 30 performs the read operation on a position, i.e., the cluster designated by the file system in the system area 6. However, when the original change mode has not been set, the read operation processing unit 30 performs the read operation on a cluster corresponding to mapping information mapped to the system area index in the mapping table 73. Here, when the mapping information is set to the initial state in the mapping table 73, the read operation processing unit 30 performs the read operation on the position, i.e., the cluster corresponding to system area index in the system area 6.

The current state backup unit 40 constructs new original system data by reflecting all content changed in the system data since the initialization. For this constructing operation, the current state backup unit 40 sequentially reads all items of the mapping table 73. When a position designated by the mapping table 73 is different from a position designated by the file system (i.e., when a mapping index is different from a corresponding system area index) in an item of the mapping table 73, the current state backup unit 40 stores data stored in a cluster designated by a pointer (i.e., the mapping index) in an original cluster (designated by the system area index). Thereafter, the initialization/recovery unit 10 performs initialization. Meanwhile, before the initialization, the current state backup unit 40 may reflect the volume bitmap or the FAT stored in the meta information table 71 to the system area 6 so that new original system data can include data newly added to the system area 6 as well as changed data.

The removing unit 60 removes the meta buffer area 7 set by the installation unit 50 to integrate the meta buffer area 7 into the system area 6. In addition, the removing unit 60 may receive confirmation on current state backup from a user so that the user can perform the backup of a current state and remove the meta buffer area 7 at a desired moment. Here, the removing unit 60 may be designed to automatically remove the software and device drivers that have been installed by the installation unit 50 in the hard disk 5.

Figure 5:
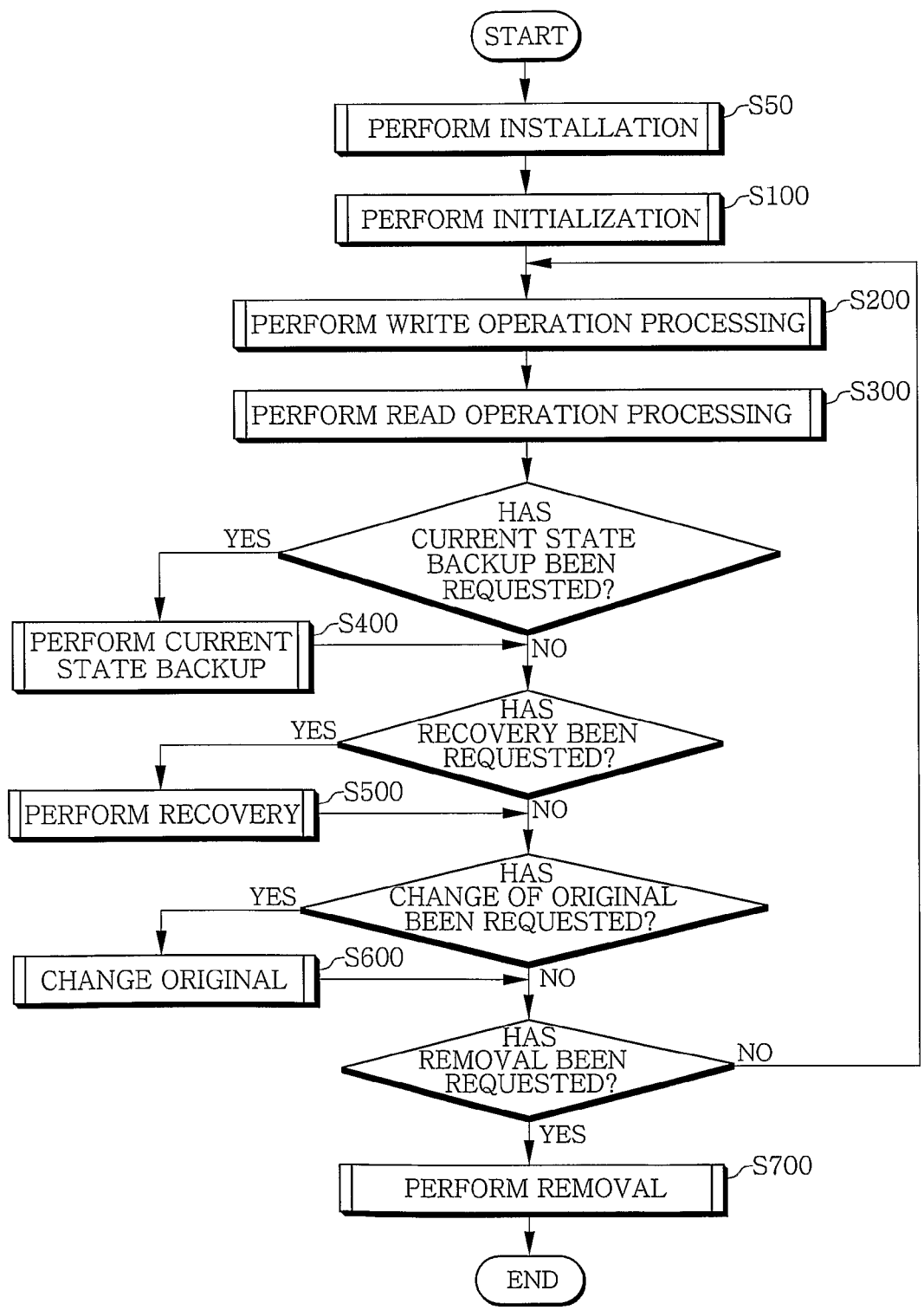
FIG. 5 is a flowchart of a method of protecting system data on a computer hard disk, by which changed system data is managed non-preemptively in a system area, according to an embodiment of the present invention.

Hereinafter, a method of protecting system data on a computer hard disk, in which changed system data is managed non-preemptively in a system area, according to an embodiment of the present invention will be described in detail with reference to FIG. 5.

In operation S50, an installation module of a hard disk protection program separately sets the system area 6 and the meta buffer area 7 in a hard disk area of a computer system. Operation S50 will be described in detail with reference to FIG. 6.

Figure 6:
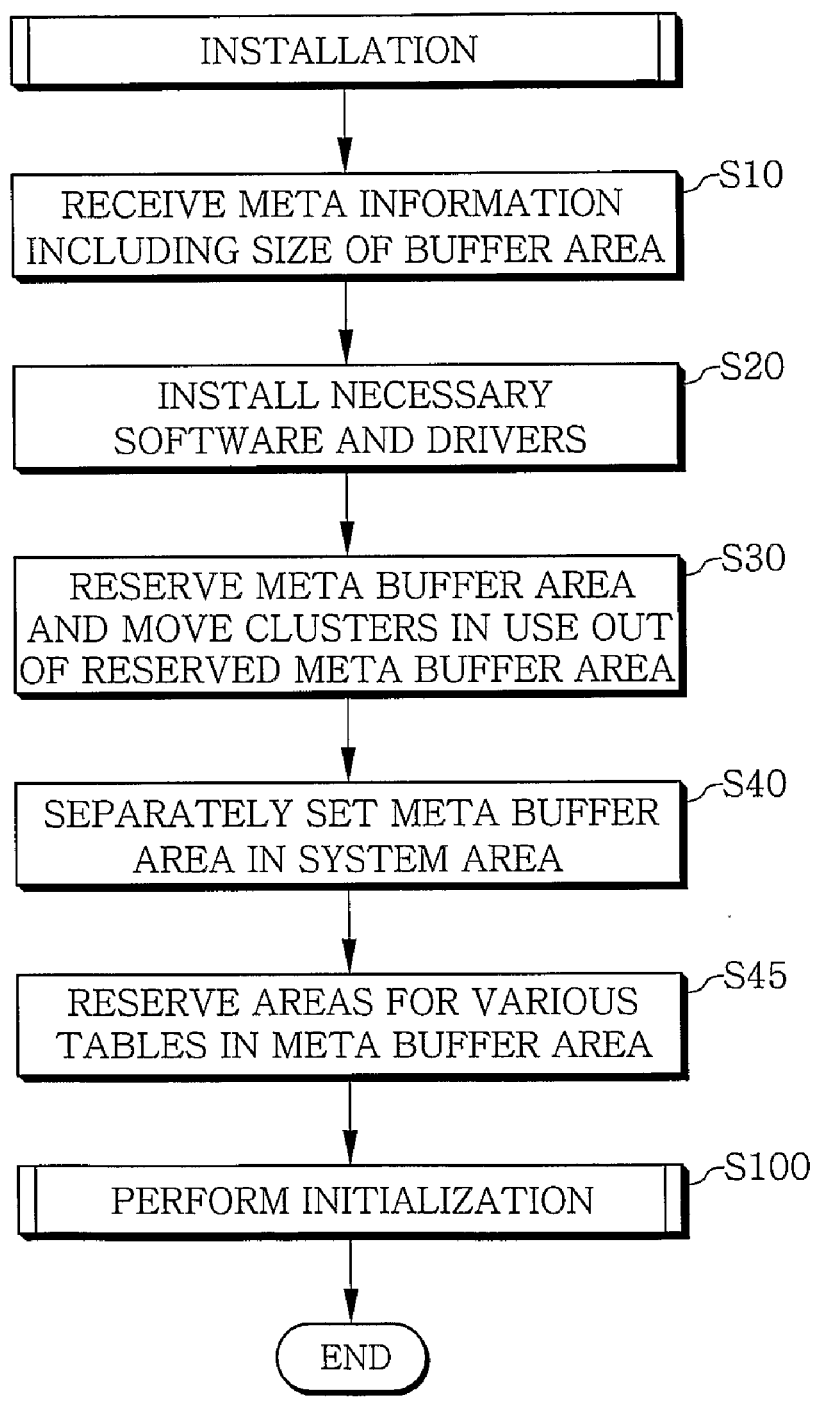
FIG. 6 is a detailed flowchart of the installing operation shown in FIG. 5.

Referring to FIG. 6, the installation module receives a size of the meta buffer area 7 in operation S10 and installs in the hard disk 5 software and device drivers that constitute a write operation processing module, a read operation processing module, and a current state backup module in operation S20. Thereafter, the installation module separately reserves the meta buffer area 7 in the system area 6 and moves clusters that are in use in the reserved meta buffer area 7 to a portion of the system area 6 outside the meta buffer area 7 in operation S30. Next, the installation module separately sets the meta buffer area 7 within the system area 6 in the hard disk 5 in operation S40 and reserves areas respectively for the meta information table 71, the system area information table 72, and the mapping table 73 in the meta buffer area 7 in operation S45. The meta buffer area 7 set through the above operations is a hidden area from the user so that the user cannot use the meta buffer area 7 to store a file. Next, the installation module calls an initialization module to perform initialization in operation S100.

In operation 100, the initialization module of the hard disk protection program marks each cluster of the system area 6 with protection information in the system area information table 72 and initializes the mapping table 73 in the meta buffer area 7. Operation 100 will be described in detail with reference to FIG. 7.

Figure 7:
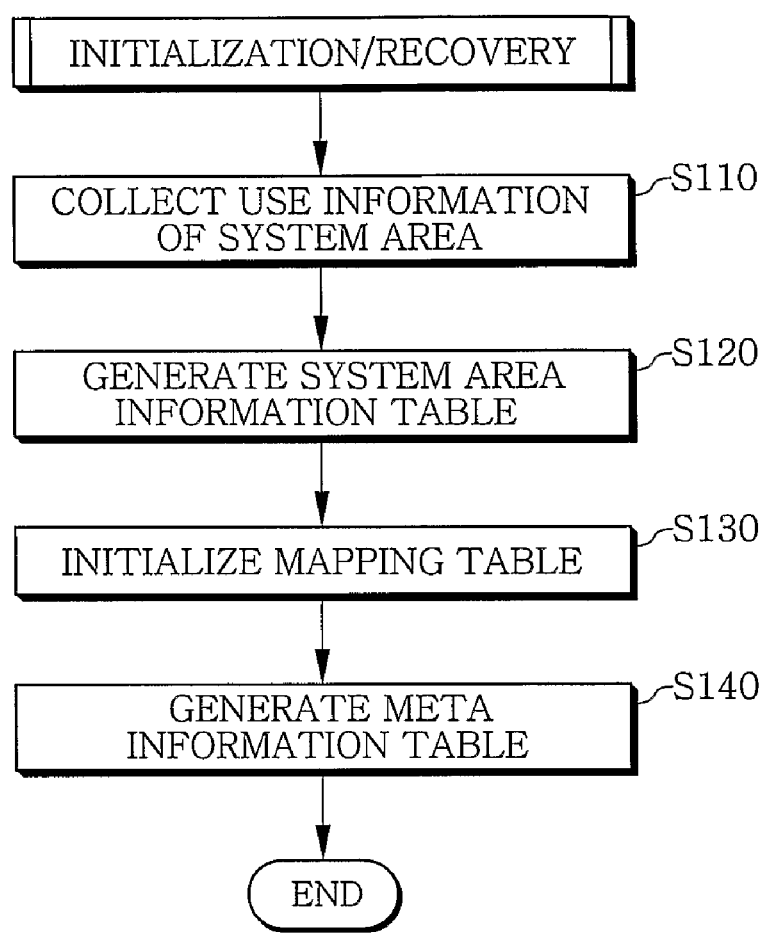
FIG. 7 is a detailed flowchart of the initializing and recovering operation shown in FIG. 5.

Referring to FIG. 7, the initialization module collects use information of the system area 6 from a volume bitmap or a FAT in operation S110. Next, in operation S120, the initialization module generates the system area information table 72 and marks a currently used space as "original" and an empty space as "non-protected" with respect to individual system area indexes in the system area information table 72. In operation S130, the initialization module initializes the mapping table 73 by allocating the same value as a system area index having the "original" as the protection information in the system area information table 72 to a corresponding mapping index in the mapping table 73 and allocating NULL to a mapping index in the mapping table 73 when a corresponding system area index does not have "original" as the protection information. In operation S140, the initialization module collects meta information and generates the meta information table 71.

Figure 8:
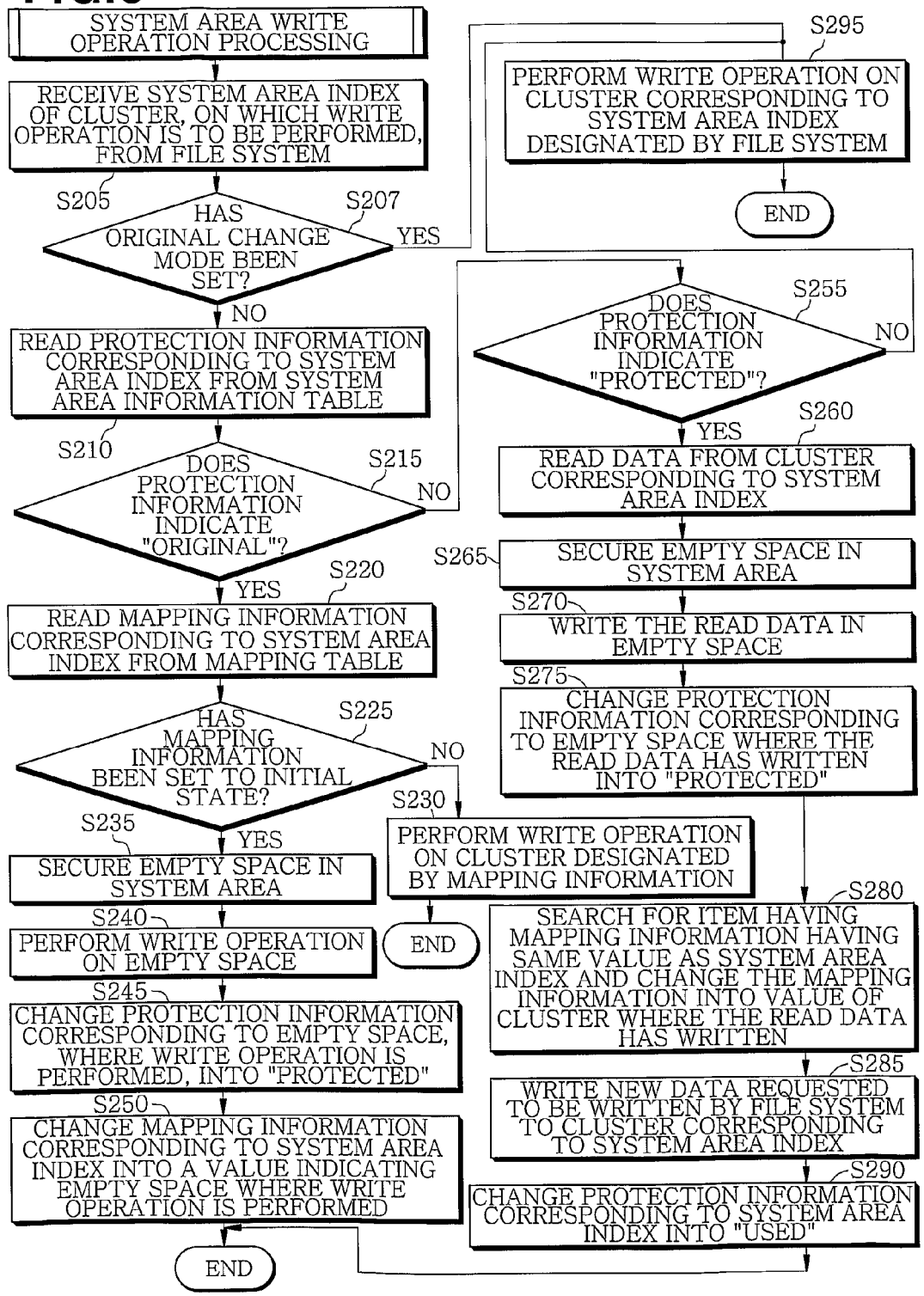
FIG. 8 is a detailed flowchart of write operation processing shown in FIG. 5.

Thereafter, a write operation processing module and a read operation processing module of the hard disk protection program intercept and process the respective write and read operations of an operating system writing and reading data into and from the hard disk 5 during operation of the computer system in operation S200 and S300, respectively. Processing a write operation on the system area 6 (operation S200) and processing of a read operation on the system area 6 (S300) will be described in detail with reference to FIGS. 8 and 9, respectively.

The write operation processing module receives from a file system a system area index corresponding to a cluster on which a write operation is to be performed in the system area 6 in operation S205 and determines whether an original change mode has been set in operation S207. If it is determined that the original change mode has been set, the write operation processing module performs the write operation on a position, i.e., the cluster designated by the file system in the system area 6 in operation S295. However, if it is determined that the original change mode has not been set, the write operation processing module reads protection information (i.e., a protection state) corresponding to the system area index from the system area information table 72 in operation S210. When it is determined that the protection information indicates an "original" state in operation S215, the write operation processing module reads mapping information corresponding to the system area index from the mapping table 73 in operation S220. When the mapping information does not have a value of an initial state (i.e., the same value as the system area index or NULL), for example, when the system area index is 1 and the mapping index is 3 in FIG. 3, in operation S225, the write operation processing module performs the write operation on a cluster corresponding to the value of the mapping information in the system area 6 in operation S230. However, when the mapping information has the value of the initial state, for example, when the system area index is 0 and the mapping index is 0 in FIG. 3, in operation S225, the write operation processing module secures an empty space in the system area 6 based on the system area information table 72 in operation S235 and performs the write operation on a cluster allocated to the empty space in operation S240. Thereafter, the write operation processing module changes the protection information of the cluster, where new data has been written, into "protected" in the system area information table 72 in operation S245 and records a position of the cluster, where the new data has been written, in a corresponding item block of the mapping table 73 in operation S250.

When the protection information indicates "protected", for example, when the protection state corresponding to the system area index 5 is "protected" in the system area information table, a mapping index corresponding to the system area index 3 is 5 in the mapping table, and the file system requests to write new data to a cluster corresponding to the system area index 5, in operation S255, the write operation processing module reads data that has been stored at the cluster corresponding to the system area index 5 in the system area 6 in operation S260, secures an empty space, e.g., a cluster corresponding to the system area index 7, in the system area 6 using the system area information table 72 in operation S265, and stores the read data in the empty space, i.e., the cluster corresponding to the system area index 7 in operation S270. Thereafter, the write operation processing module marks the protection state of the cluster (corresponding to the system area index 7), where the read data is newly stored, as "protected" in the system area information table 72 in operation S275. Next, the write operation processing module searches for an item (i.e., the system area index 2) having mapping information having the same value as the system area index 5, for which the file system has requested a data write, and changes the mapping information of the item into a position (i.e., a mapping index 7) of the cluster where the read data is newly stored in operation S280. Thereafter, the write operation processing module writes the new data, which has been requested to be written by the file system, to the cluster corresponding to the system area index 5 in operation S285 and changes the protection information corresponding to the system area index 5 into "used" in operation S290.

Meanwhile, when it is determined that the protection information read in operation S210 is "used" or "non-protected" through operations S215 and S255, the write operation processing module performs the write operation on the cluster corresponding to the system area index designated by the file system in the system area 6 in operation S295. Here, the write operation processing module reflects changed content corresponding to a FAT or a volume bitmap to a FAT or a volume bitmap included in the meta information table 71 not to an original FAT or volume bitmap.

Figure 9:
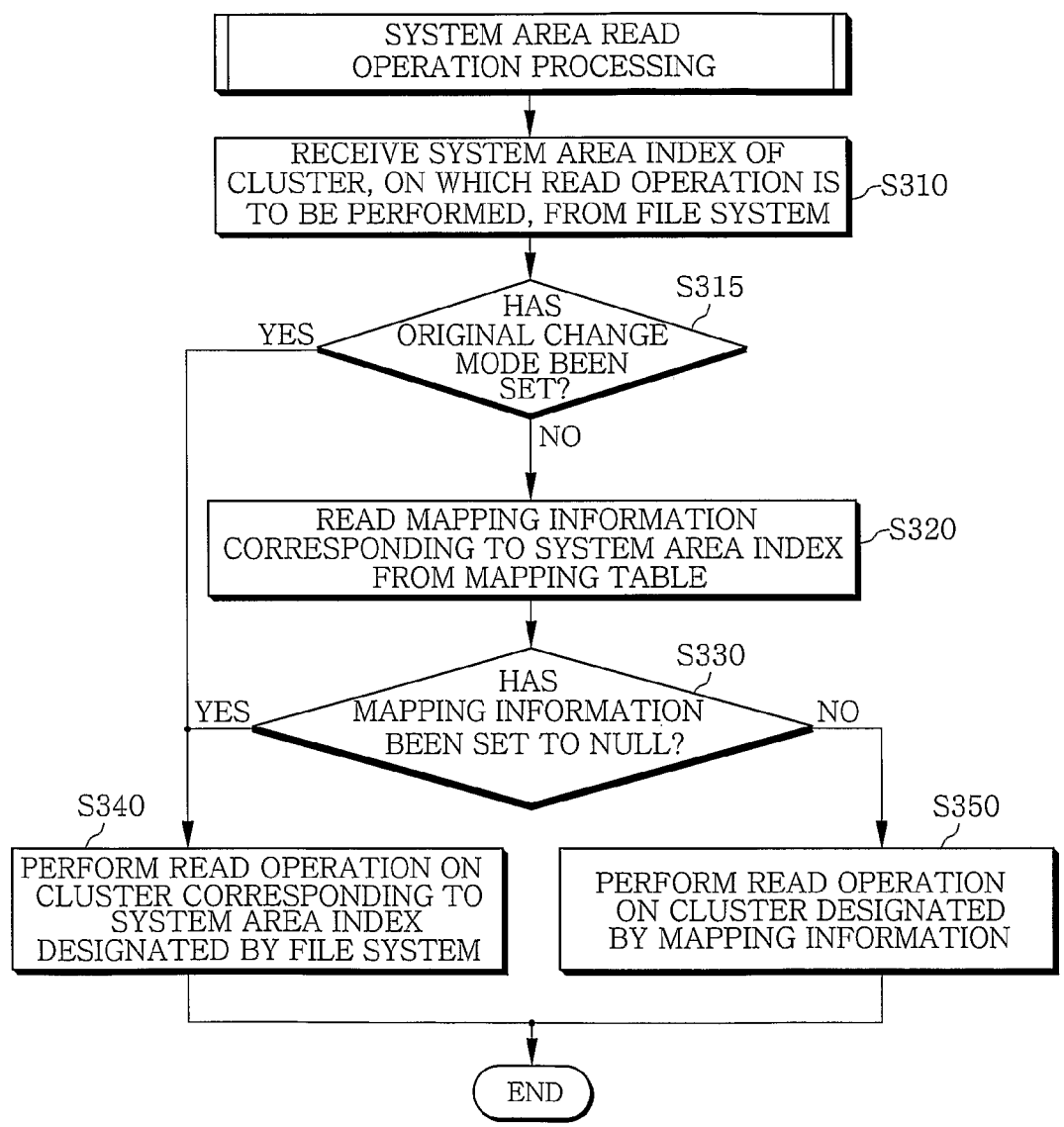
FIG. 9 is a detailed flowchart of read operation processing shown in FIG. 5.

Referring to FIG. 9, the read operation processing module receives from the file system a system area index corresponding to a cluster on which a read operation is to be performed in the system area 6 in operation S310 and determines whether the original change mode has been set in operation S315. If it is determined that the original change mode has been set, the read operation processing module performs the read operation on the cluster corresponding to the system area index designated by the file system in the system area 6 in operation S340. However, if it is determined that the original change mode has not been set, the read operation processing module reads mapping information corresponding to the system area index from the mapping table 73 in operation S320. When it is determined that the mapping information is set to NULL in operation S330, the read operation processing module performs the read operation on the cluster corresponding to the system area index designated by the file system in the system area 6 in operation S340. However, when it is determined that the mapping information is not set to NULL, the read operation processing module performs the read operation on a cluster in the system area 6 that corresponds to a mapping index designated by the mapping table 73 in operation S350.

When the user requests current state backup or when a current state backup period set according to environment variables comes around, the hard disk protection program performs current state backup to maintain the current state of the system data as new original system data using a current state backup module in operation S400, which will be described in detail with reference to FIG. 10.

Figure 10:
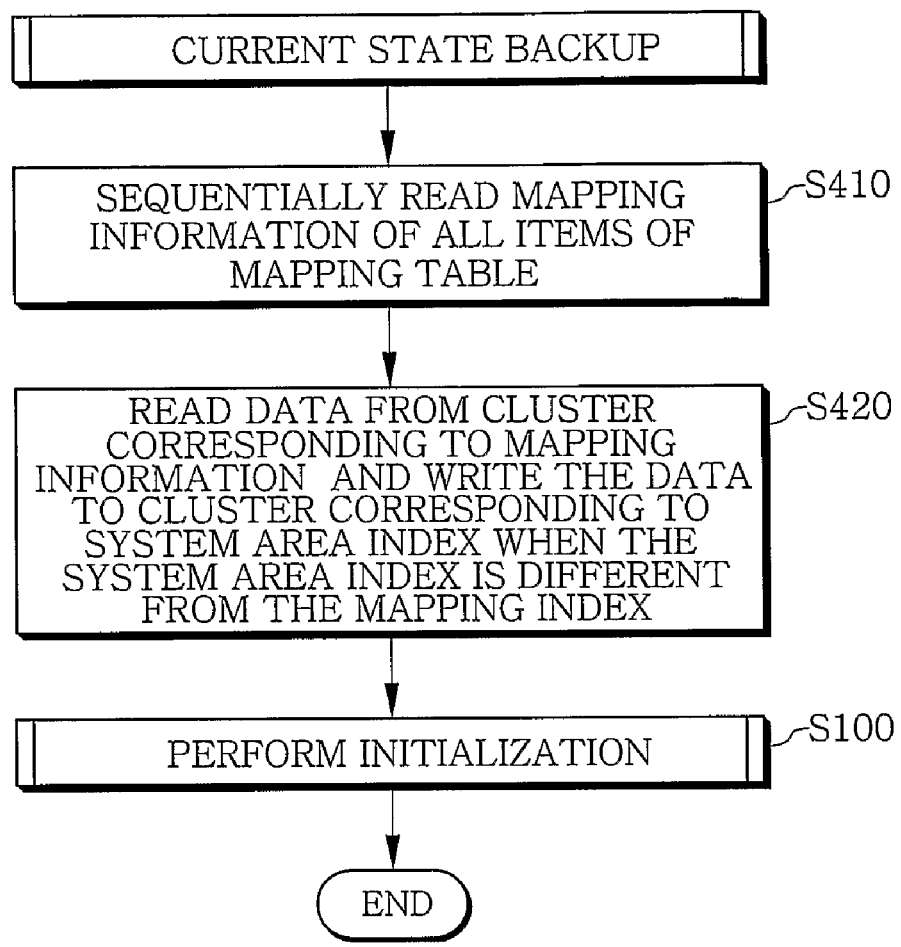
FIG. 10 is a detailed flowchart of the current state backup operation shown in FIG. 5.

Referring to FIG. 10, the current state backup module sequentially reads all items of the mapping table 73 in operation S410. Whenever a position designated by the mapping table 73 is different from a position designated by the file system (i.e., when a mapping index is different from a corresponding system area index) in an item of the mapping table 73, the current state backup module reads data a cluster corresponding to the mapping index and writes the data to a cluster corresponding to the system area index in operation S420. After such backup operation is completed with respect to all items of the mapping table 73, it is needed to reflect the volume bitmap or FAT stored in the meta information table 71 to the system area 6. After the current state backup is completed, initialization is performed by the initialization module in operation S100, thereby having new original system data.

When the user requests recovery or a recovery period set according to the environment variables comes around, the hard disk protection program deletes all content, which has been changed in the system area 6 since the initialization, using a recovery module in operation S500. Here, the recovery module performs the same operations shown in FIG. 7 as the initialization module.

After the recovery, when the user requests to change a mode into the original change mode, the hard disk protection program changes the system mode into the original change mode and performs the change of the original in operation S600. In the original change mode, the user can directly change data in the system area 6, as described with reference to FIG. 8. Thereafter, when the user requests to cancel the original change mode, the initialization is performed as shown in FIG. 7 to change the system mode into an original protection mode.

When the user requests to remove the hard disk protection program, a removing module integrates the system area 6 and the meta buffer area 7 and removes the hard disk protection program from the hard disk 5 in operation S700, which will be described in detail with reference to FIG. 11.

Figure 11:
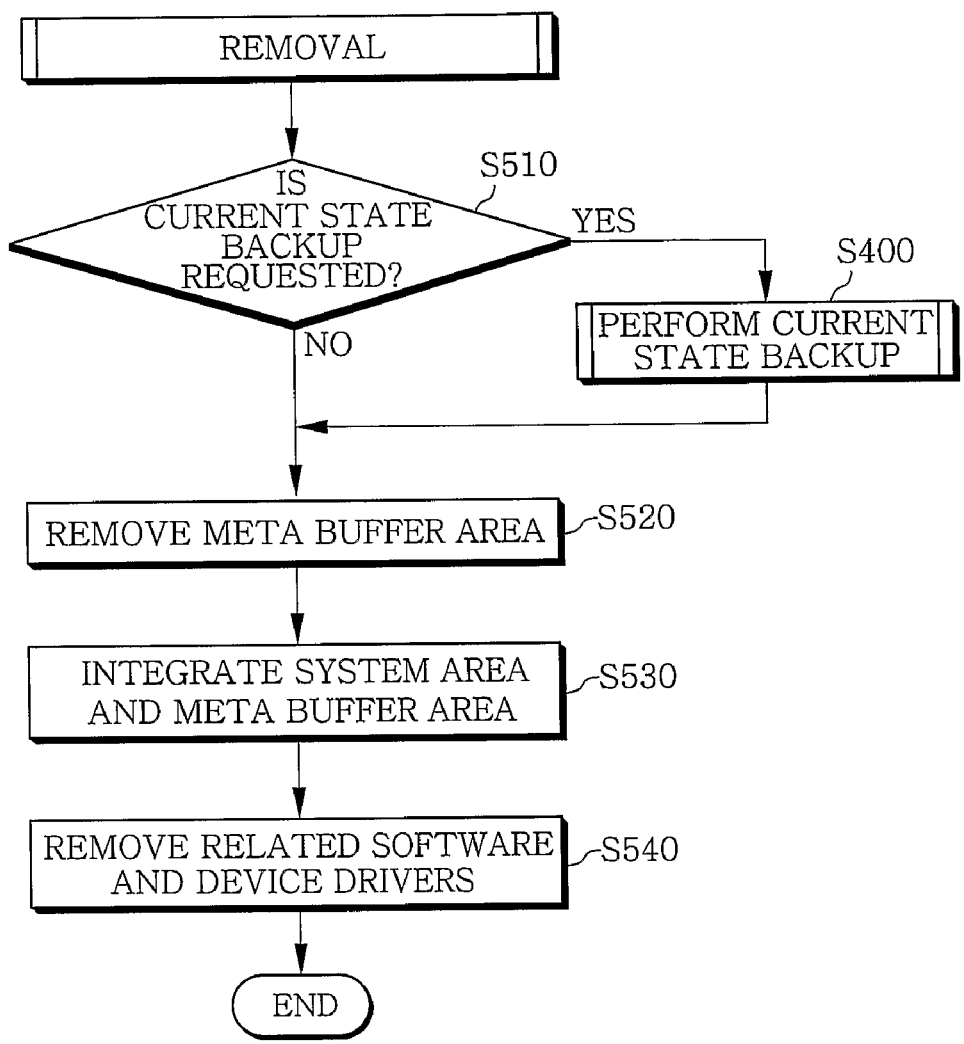
FIG. 11 is a detailed flowchart of the removing operation shown in FIG. 5.

Referring to FIG. 11, the removing module receives confirmation on the current state backup from the user in operation S510 and calls the current state backup module to perform the current state backup in operation 400 when the user wants the current state backup. Thereafter, the removing module removes the meta buffer area 7 set by the installation module in operation S520 and integrates the system area 6 and the meta buffer area 7 into a single system area in operation S530. In addition, the removing module automatically removes the software and device drivers constituting the hard disk protection program from the hard disk 5 in operation S540.

The present invention can be realized as a program (i.e., a hard disk protection program) which is recorded on a computer readable recording medium and can be read by a computer. The computer readable recording medium may be a magnetic storage medium (e.g., a ROM, a floppy disk, or a hard disk), an optical readable medium (e.g., CD-ROM or DVD), or carrier waves (for example, transmitted through Internet).

While this invention has been particularly shown and described with reference to preferred embodiments thereof, it will be understood by those skilled in the art that various changes may be made therein without departing from the scope of the invention. Therefore, the above-described embodiments will be considered not in restrictive sense but in descriptive sense only. The scope of the invention will be defined not by the above description but by the appended claims, and it will be construed that all differences made within the scope defined by the claims are included in the present invention.

INDUSTRIAL APPLICABILITY

According to the present invention, system data set as an original is not changed at all since initialization, and therefore, corrupted system data can be quickly recovered just by performing initialization. Since not an entire system area but only a part needing protection in the system area is selectively managed using a system area information table and a mapping table, time taken to access the system data can be reduced, thereby minimizing the decrease of system processing speed In addition, since changed data is backed up to and managed in empty space within the system area to protect and recover the original system data, a separate data buffer area for storing the changed data is not needed but only a meta buffer area for storing a meta information table, a system area information table, and a mapping table is needed. As a result, buffer space needed to protect a large amount of system data can be remarkably reduced.

Moreover, the present invention provides a method of automatically reflecting system data that is currently in use to a recovery original using the mapping table and the system area information table so that a user can easily change the recovery original and the system data is prevented from being fatally damaged due to an attack of a virus program or the user's mistake during the change of the recovery original.

In addition, instead of definitely setting a separate area in the system area, changed data is stored in empty space in the system area. As a result, disk space can be utilized flexibly.

Furthermore, since only the mapping table is used for a read operation on the system area and a current state backup operation, additional processing time is minimized.

Moreover, since a mapping chain according to which current state backup must be sequentially performed is short, even if an error occurs during the current state backup, the operation can be easily repeated. In addition, the amount of system data reflected to an original is minimized, thereby minimizing current state backup time.

What is claimed is:

1. An apparatus for protecting system data on a computer hard disk, in which changed system data is managed non-preemptively in a system area, the apparatus comprising:

an installation unit separately setting a system area and a meta buffer area on the computer hard disk and reserving areas for a meta information table, a system area information table, and a mapping table in the meta buffer area;

an initialization/recovery unit initializing the system area information table, in which each of clusters in the system area is marked as one among "original", "protected", and "non-protected" based on one of a volume bitmap and a file allocation table (FAT), and initializing the mapping table storing mapping relation between a cluster position recognized by a file system and a cluster position where data is actually stored in the system area;

a write operation processing unit, with respect to a write operation on a cluster of the system area designated by the file system, performing the write operation on another corresponding cluster designated by the mapping table when the cluster designated by the file system is marked as "original" in the system area information table, performing the write operation on a cluster corresponding to an empty space in the system area when the cluster designated by the file system is marked as "original" in the system area information table and a value designated by the mapping table with respect to the cluster designated by the file system indicates an initial state, storing data read from the cluster designated by the file system in an empty space in the system area and performing the write operation on the cluster designated by the file system when the cluster designated by the file system is marked as "protected" in the system area information table, and performing the write operation on the cluster designated by the file system in otherwise cases;

a read operation processing unit, with respect to a read operation on a cluster of the system area designated by the file system, performing the read operation on another corresponding cluster designated by the mapping table, and performing the read operation on the cluster designated by the file system only when a corresponding value designated by the mapping table indicates the initial state;

a current state backup unit sequentially reading all items of the mapping table one by one, storing data stored in a cluster designated by the mapping table in a cluster designated by the file system with respect to an item in which the cluster designated by the file system is different from the cluster designated by the mapping table, and then calling the initialization/recovery unit to perform initialization; and a removing unit removing the meta buffer area set by the installation unit to integrate the meta buffer area into the system area, wherein when the cluster designated by the file system is marked as "original" in the system area information table and when a corresponding value designated by the mapping table is set to the initial state, the write operation processing unit comprises securing an empty space in the system area, performing the write operation on a cluster allocated to the secured empty space, and marking the cluster allocated to the secured empty space as "protected" in the system area information table, and when the cluster designated by the file system is marked as "protected" in the system area information table, the write operation processing unit comprises securing an empty space in the system area, reading data from the cluster designated by the file system requesting the write operation, storing the read data in the empty space, performing the write operation on the cluster designated by the file system, changing a protection state of the empty space where the read data has been stored into "protection" in the system area information table.

2. The apparatus of claim 1, wherein when an original change mode has been set, the write operation processing unit performs the write operation on the cluster of the system area designated by the file system, and the read operation processing unit performs the read operation on the cluster of the system area designated by the file system.

3. The apparatus of claim 1, wherein when an original change mode has been set, the write operation processing unit performs the write operation on the cluster of the system area designated by the file system, and the read operation processing unit performs the read operation on the cluster of the system area designated by the file system.

4. A method of protecting system data on a computer hard disk, in which changed system data is managed non-preemptively in a system area, the method comprising the operations of:

(a) separately setting a system area and a meta buffer area on the computer hard disk and reserving areas for a meta information table, a system area information table, and a mapping table in the meta buffer area;

(b) initializing the system area information table, in which each of clusters in the system area is marked as one among "original", "protected", and "non-protected" based on one of a volume bitmap and a file allocation table (FAT), and initializing the mapping table storing mapping relation between a cluster position recognized by a file system and a cluster position where data is actually stored in the system area;

(c) with respect to a write operation on a cluster of the system area designated by the file system, performing the write operation on another corresponding cluster designated by the mapping table when the cluster designated by the file system is marked as "original" in the system area information table, performing the write operation on a cluster corresponding to an empty space in the system area when the cluster designated by the file system is marked as "original" in the system area information table and a value designated by the mapping table with respect to the cluster designated by the file system indicates an initial state, storing data read from the cluster designated by the file system in an empty space in the system area and performing the write operation on the cluster designated by the file system when the cluster designated by the file system is marked as "protected" in the system area information table, and performing the write operation on the cluster designated by the file system in otherwise cases;

(d) with respect to a read operation on a cluster of the system area designated by the file system, performing the read operation on another corresponding cluster designated by the mapping table, and performing the read operation on the cluster designated by the file system only when a corresponding value designated by the mapping table indicates the initial state;

(e) generating a new system area information table, in which each of clusters in the system area is marked as one among "original", "protected", and "non-protected" based on one of the volume bitmap and the FAT, and initializing the mapping table storing mapping relation between a cluster position recognized by a file system and a cluster position where data is actually stored in the system area; and (f) removing the meta buffer area set in operation (a) to integrate the meta buffer area into the system area, wherein:

when the cluster designated by the file system is marked as "original" in the system area information table and when a corresponding value designated by the mapping table is set to the initial state, operation (c) comprises securing an empty space in the system area, performing the write operation on a cluster allocated to the secured empty space, and marking the cluster allocated to the secured empty space as "protected" in the system area information table, and when the cluster designated by the file system is marked as "protected" in the system area information table, operation (c) comprises securing an empty space in the system area, reading data from the cluster designated by the file system requesting the write operation, storing the read data in the empty space, performing the write operation on the cluster designated by the file system, changing a protection state of the empty space where the read data has been stored into "protection" in the system area information table, changing the protection state of the cluster designated by the file system into "used", and changing mapping information having the same value as the cluster designated by the file system into a value of a cluster corresponding to the empty space where the read data has been stored.

5. The method of claim 4, wherein when an original change mode has been set, operation (c) comprises performing the write operation on the cluster of the system area designated by the file system, and operation (d) comprises performing the read operation on the cluster of the system area designated by the file system.

6. The method of claim 4, further comprising, before operation (e), (g) sequentially reading all items of the mapping table one by one, storing data stored in a cluster designated by the mapping table in a cluster designated by the file system with respect to an item in which the cluster designated by the file system is different from the cluster designated by the mapping table, and then performing operation (b).

7. A computer readable recording storage medium for storing a program for executing a method of protecting system data on a computer hard disk, in which changed system data is managed non-preemptively in a system area, on a computer, the method comprising the operations of:

(a) separately setting a system area and a meta buffer area on the computer hard disk and reserving areas for a meta information table, a system area information table, and a mapping table in the meta buffer area;

(b) initializing the system area information table, in which each of clusters in the system area is marked as one among "original", "protected", and "non-protected" based on one of a volume bitmap and a file allocation table (FAT), and initializing the mapping table storing mapping relation between a cluster position recognized by a file system and a cluster position where data is actually stored in the system area;

(c) with respect to a write operation on a cluster of the system area designated by the file system, performing the write operation on another corresponding cluster designated by the mapping table when the cluster designated by the file system is marked as "original" in the system area information table, performing the write operation on a cluster corresponding to an empty space in the system area when the cluster designated by the file system is marked as "original" in the system area information table and a value designated by the mapping table with respect to the cluster designated by the file system indicates an initial state, storing data read from the cluster designated by the file system in an empty space in the system area and performing the write operation on the cluster designated by the file system when the cluster designated by the file system is marked as "protected" in the system area information table, and performing the write operation on the cluster designated by the file system in otherwise cases;

(d) with respect to a read operation on a cluster of the system area designated by the file system, performing the read operation on another corresponding cluster designated by the mapping table, and performing the read operation on the cluster designated by the file system only when a corresponding value designated by the mapping table indicates the initial state;

(e) generating a new system area information table, in which each of clusters in the system area is marked as one among "original", "protected", and "non-protected" based on one of the volume bitmap and the FAT, and initializing the mapping table storing mapping relation between a cluster position recognized by a file system and a cluster position where data is actually stored in the system area; and (f) removing the meta buffer area set in operation (a) to integrate the meta buffer area into the system area, wherein:

when the cluster designated by the file system is marked as "original" in the system area information table and when a corresponding value designated by the mapping table is set to the initial state, operation (c) comprises securing an empty space in the system area, performing the write operation on a cluster allocated to the secured empty space, and marking the cluster allocated to the secured empty space as "protected" in the system area information table, and when the cluster designated by the file system is marked as "protected" in the system area information table, operation (c) comprises securing an empty space in the system area, reading data from the cluster designated by the file system requesting the write operation, storing the read data in the empty space, performing the write operation on the cluster designated by the file system, changing a protection state of the empty space where the read data has been stored into "protection" in the system area information table, changing the protection state of the cluster designated by the file system into "used", and changing mapping information having the same value as the cluster designated by the file system into a value of a cluster corresponding to the empty space where the read data has been stored.

* * * * *